(12) United States Patent
Landwehr

(10) Patent No.: US 8,284,531 B2
(45) Date of Patent: Oct. 9, 2012

(54) VOLTAGE PROTECTION ARRANGEMENT FOR AN ELECTRONIC DEVICE

(75) Inventor: Heinz-Carsten Landwehr, Lemgo (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 548 days.

(21) Appl. No.: 12/521,613

(22) PCT Filed: Dec. 21, 2007

(86) PCT No.: PCT/EP2007/011323
§ 371 (c)(1),
(2), (4) Date: Jun. 29, 2009

(87) PCT Pub. No.: WO2008/080576
PCT Pub. Date: Jul. 10, 2008

(65) Prior Publication Data
US 2010/0321844 A1  Dec. 23, 2010

(30) Foreign Application Priority Data

Dec. 29, 2006 (DE) .......................... 10 2006 062 554
Apr. 13, 2007 (DE) .......................... 10 2007 017 858

(51) Int. Cl.
*H02H 5/00* (2006.01)
*H02H 3/20* (2006.01)
(52) U.S. Cl. .............................. 361/71; 361/90; 361/91.1
(58) Field of Classification Search .................. 361/71, 361/90, 91.1
See application file for complete search history.

(56) References Cited

U.S. PATENT DOCUMENTS

| 4,638,175 | A | * | 1/1987 | Bradford et al. ................ 307/64 |
| 4,847,720 | A | * | 7/1989 | Dezonno ......................... 361/18 |
| 4,996,520 | A | * | 2/1991 | Williams et al. .............. 340/662 |
| 5,691,622 | A | * | 11/1997 | Mack et al. .................... 320/134 |
| 5,946,270 | A | | 8/1999 | Jang |
| 6,606,227 | B2 | * | 8/2003 | Rapsinski et al. .............. 361/86 |
| 2002/0166073 | A1 | * | 11/2002 | Nguyen et al. ................ 713/300 |
| 2004/0057179 | A1 | * | 3/2004 | Galang et al. ................... 361/90 |

FOREIGN PATENT DOCUMENTS

| DE | 34 25 235 C1 | 2/1986 |
| EP | 0 349 750 A1 | 1/1990 |
| JP | 2002-218645 A | 8/2002 |

* cited by examiner

*Primary Examiner* — Jared Fureman
*Assistant Examiner* — Scott Bauer
(74) *Attorney, Agent, or Firm* — Roberts Mlotkowski Safran & Cole, P.C.; David S. Safran

(57) ABSTRACT

A voltage protection arrangement for an electronic device, in particular for a control system in automation engineering has a great functionality, and also a greater range of applications, due to the fact that the arrangement has a switching-off unit and a voltage detection unit connected to the output of the switching-off unit, the switching-off unit having a voltage comparator and a normally electrically closed switch connected to the output of the voltage comparator, arranged between the input and the output of the switching-off unit, wherein the voltage detection unit has a voltage comparator and a switch output connected to the output of the voltage comparator for signaling an impermissible voltage, and wherein, in the event of an impermissible voltage occurring at the input of the switching-off unit, the electrical switch is opened and, in the event of a subsequent permissible voltage occurring, the switch is closed again.

15 Claims, 3 Drawing Sheets

VOLTAGE PROTECTION ARRANGEMENT FOR AN ELECTRONIC DEVICE

BACKGROUND OF THE INVENTION

1. Field of the Invention

The invention relates to a voltage protection arrangement for an electronic device, especially for a control in automation engineering.

2. Description of Related Art

Electronic devices, especially controls in automation engineering, require a certain DC voltage supply whose value may fluctuate only within a certain range. If the supply voltage is outside the specified voltage range, this can lead to faults in the electronic device, for example, improper operations, or incorrect reports of a control or even to destruction of the electronic device. Destruction of the electronic device or components of the electronic device can occur especially when an overvoltage is present. Therefore, the prior art discloses protecting sensitive and high-quality electronic devices against harmful overvoltages using voltage protection arrangements.

In the DC voltage range in which the voltage protection arrangement of this invention is primarily used, for this purpose, overvoltage protection circuits consisting of a fuse and a Z diode or a suppressor diode have been used in practice to date. If there is an overvoltage on such an overvoltage circuit, this leads to triggering of the fuse made generally as a fusible link, by which the electronic device to be protected is isolated from the voltage supply. The value of the overvoltage at which the overvoltage protection circuit responds can be fixed by the choice of a suitable Z diode or suppressor diode.

One fundamental disadvantage of such an overvoltage protection circuit consists in that the fuse for protection of the downstream electronic device is intentionally destroyed in the case of an overvoltage so that, after eliminating the overvoltage, the electronic device to be protected is isolated from the voltage supply. The electronic device is only serviceable again when the overvoltage protection circuit has been repaired beforehand, i.e., the fuse has been replaced.

In recent years, safety engineering in machine building and plant engineering has acquired growing importance. This results in additional demands for voltage protection and fault tolerance of control and other safety relevant electronic devices. In particular, it is required that machines and systems, in case of a fault, are transferred into the safe state so that a risk to individuals or the environment is avoided. Moreover, it is often desired that when a fault, for example, an overvoltage, occurs, not only is the electronic device to be protected turned off, but the fault is also reported.

SUMMARY OF THE INVENTION

Therefore, the object of this invention is to provide a voltage protection arrangement for an electronic device, especially for a control in automation engineering, which has greater functionality, and thus, a wider range of application.

This object is achieved in accordance with the invention in that the initially named voltage protection arrangement has a shutoff unit and a voltage detection unit connected to the output of the shutoff unit, the shutoff unit having a voltage comparator and an electric switch which is closed in the normal case, which is located between the input and the output of the shutoff unit, and which is connected to the output of the voltage comparator, the voltage detection unit having a voltage comparator and a switching signal output connected to the output of the voltage comparator for reporting an impermissible voltage, and when an impermissible voltage $U_1$ is present at the input of the shutoff unit, the electric switch being opened and when an allowable voltage $U_2$ is then present the switch being closed again.

The voltage protection arrangement in accordance with the invention is characterized first of all in that functionally it has at least two stages, the shutoff unit and the voltage detection unit, the shutoff unit being designed primarily to shut off the electronic device to be protected when an impermissible voltage arises, while the voltage detection unit is designed primarily, when an impermissible voltage occurs, to display the voltage by means of the switching signal output.

One important advantage of the shutoff unit consists in that the electronic device to be protected is not shut off by means of a fuse, but by means of an electronic switch. This leads, first of all, to the fact that, after eliminating the impermissible voltage, the switch can be closed again so that the electronic device to be protected is again supplied with an allowable operating voltage. Thus, a service intervention is not necessary when an impermissible voltage occurs since the shut-off unit works in a "self-healing" manner. As soon as the voltage comparator of the shutoff unit ascertains that an allowable voltage is present again at its input, the electric switch is closed again, by which, likewise, an allowable voltage is present again on the electronic device to be protected. The electronic switch can be a transistor, especially a field effect transistor or a relay.

Because the voltage protection arrangement in accordance with the invention also has a voltage detection unit in addition to the shutoff unit, the presence of an impermissible voltage can also be displayed. When an impermissible voltage is detected, a safety function can be initiated by way of the switching signal input which is provided on the voltage detection unit for this purpose. However, it is also possible that a message to a higher-order control, or a message can be sent to another channel of the control of a multichannel architecture of a control to be protected, by way of the switching signal output.

According to one preferred embodiment of the invention, the voltage detection unit, additionally, has a test stage by which the function of the voltage comparator of the voltage detection unit and of the switching signal output connected to it can be tested. By means of the test stage, a voltage can be applied to an input of the voltage comparator, whose value lies outside the allowable range. If the voltage comparator and the switching signal output of the voltage detection unit are in an error-free state, this leads to a corresponding output signal on the switching signal output which can be ascertained by the test stage or a separate detection unit. In a preferred two-channel or multichannel control, version of the electronic device to be protected, for example, both the test voltage on the voltage comparator is triggered and the resulting output signal is evaluated at the switching signal output by the CPU of the second channel.

It was stated above that the voltage protection arrangement in accordance with the invention is made at least in two stages, specifically a shutoff stage and a voltage detection stage. According to a preferred configuration, the voltage protection arrangement additionally has a overvoltage protection unit which is connected to the input of the shutoff unit as coarse protection, so that the voltage protection arrangement is made altogether in three stages. The overvoltage protection unit is made such that it responds only starting at an overvoltage which is distinctly greater than the allowable supply voltage of the electronic device to be protected and also is distinctly larger than the overvoltage at which the electric switch of the shutoff unit is opened. This leads, on the one hand, at lower overvoltages which can be "processed" by the shutoff unit to the overvoltage protection unit intentionally not responding, but on the other hand, the shutoff unit, and thus, also the electronic device to be protected being protected against destruction for correspondingly large overvoltages. Altogether, in this way, a voltage protection arrangement is provided which can be used in a large voltage range.

The overvoltage protection unit can be easily implemented by a fuse and an overvoltage protection element, especially a suppressor diode or a Z diode. The corresponding choice of the overvoltage protection element fixes both the overvoltage starting from which the overvoltage protection unit responds, and also the voltage range within which the shutoff unit operates. One skilled in the art will, therefore, select the overvoltage protection element such that the shutoff unit generally shuts off the smaller overvoltages which occur, while only for extreme overvoltages does the protection of the overvoltage protection unit take effect.

According to another preferred embodiment of the voltage protection arrangement in accordance with the invention, the voltage comparator of the shutoff unit is made such that it has a hysteresis. The voltage comparator is wired such that the voltage $U_1$ at which the electric switch opens is greater than the voltage $U_2$ at which the switch closes again. The comparator threshold of the voltage comparator can be easily set in practice by a voltage divider which is implemented from resistors, the voltage divider being made such that after enabling the voltage comparator a resistor is connected in parallel to one branch of the voltage divider by which the comparator threshold of the voltage divider changes. In this way, oscillation of the circuit is prevented so that the electronic switch does not continuously open and close at an overvoltage which corresponds to the first comparator threshold of the voltage comparator. The difference between the voltage $U_1$ at which the electronic switch opens, and the voltage $U_2$ at which the electronic switch again closes need only be a few percent.

While, with the overvoltage protection circuits known from the prior art consisting of a fuse and a Z diode, only protection of the downstream electronic device against overvoltage can be implemented, with the voltage protection arrangement in accordance with the invention undervoltages can also be detected and the corresponding measures can be initiated. For this purpose, the shutoff unit has two voltage comparators, the first voltage comparator being designed for ascertaining an undervoltage, and the second voltage comparator being designed for ascertaining an overvoltage. The output of the first voltage comparator is connected to the input of the second voltage comparator and the output of the second voltage comparator is connected to the electric switch. This ensures that the electric switch is only closed, and thus, the electronic device to be protected is only supplied with a voltage when the voltage is within an allowable range. For voltages which are smaller than the comparator threshold of the first voltage comparator or greater than the comparator threshold of the second voltage comparator, the electronic device to be protected is turned off by the electronic switch. Wiring of the two voltage comparators to one another, moreover, results in that the second voltage comparator becomes active only when the voltage on the first voltage comparator is greater than the comparison value set by way of the comparator threshold for the undervoltage.

Like the shutoff unit, the voltage detection unit can also have two voltage comparators so that both an undervoltage and also an overvoltage can be detected and reported via the switching output. Moreover, a voltage detection unit with two voltage comparators can also be used to monitor two different voltages for overvoltages. This is advantageous when the electronic device to be monitored has a microprocessor which requires a core voltage which is less than the actual supply voltage of the electronic device which the processor uses to process its I/O functions. However, in this case, the two voltage comparators of the voltage detection unit are not connected in series, but are made independently of one another.

It was stated initially that, in the voltage protection arrangement in accordance with the invention, the shutoff unit and the voltage detection unit have a voltage comparator. Fundamentally, it is possible to use the same voltage comparator for the shutoff unit and the voltage detection unit. However, in order for the two stages of the voltage protection arrangement to be independent, it is preferably provided that the shutoff unit and the voltage detection unit each have its own voltage comparator or its own voltage comparators to which its own reference voltage is provided. The reference voltage of the voltage comparators of the two stages is preferably derived from a respective reference voltage diode.

In particular, there are a host of possibilities for embodying and developing the voltage protection arrangement in accordance with the invention. For this purpose reference is made to the following description of preferred embodiments in conjunction with the drawings.

DETAILED DESCRIPTION OF THE INVENTION

Figure 1:
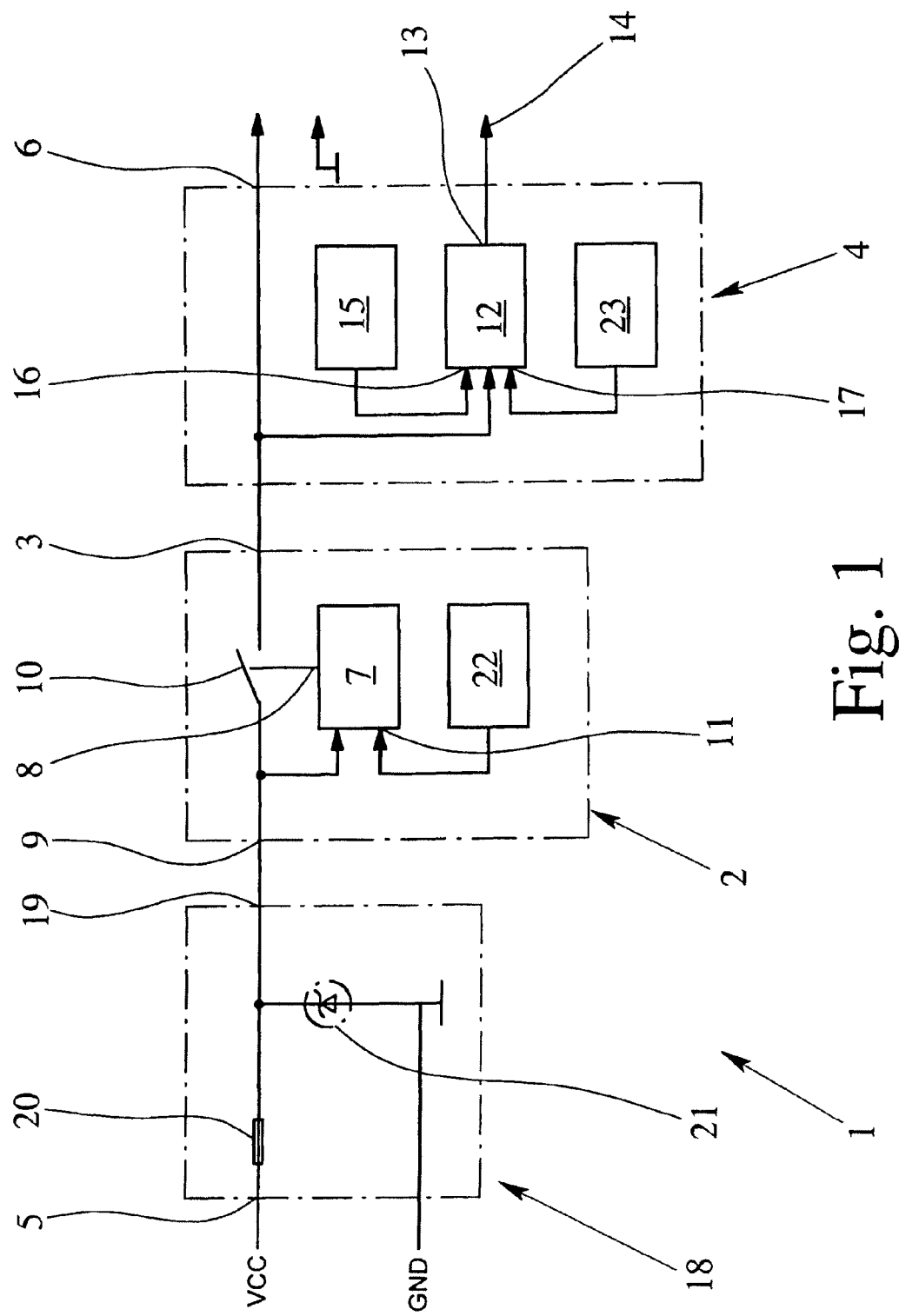
FIG. 1 is a block diagram of a first embodiment of a voltage protection arrangement in accordance with the invention.

FIG. 1 shows a block diagram of a voltage protection arrangement 1 in accordance with the invention which has a shutoff unit 2, a voltage detection unit 4 connected to the output of the shutoff unit 2, and a overvoltage protection unit 18. Using the voltage protection arrangement 1, it is ensured that a supply voltage VCC which is at the input 5 of the voltage protection arrangement 1 is provided to an electronic device connected to the output 6 of the voltage protection arrangement 1 when the supply voltage is within allowable limits.

The shutoff unit 2 shown in FIG. 1 has a voltage comparator 7 and an electronic switch 10 which is located between the input 9 and the output 3 of the shutoff unit 2 and which is connected to the output 8 of the voltage comparator 7. The electronic switch 10 is preferably made as a field effect transistor. If the voltage at the input 9 of the shutoff unit 2 is below a threshold value which prevails at the reference input 11 of the voltage comparator 7, the switch 10 is closed so that the allowable supply voltage is provided to the electronic device connected to the output 6 of the voltage protection arrangement 1.

The voltage detection unit 4 has a voltage comparator 12 and a switching signal output 14 connected to the output 13 of the voltage comparator 12 for reporting an impermissible voltage. Moreover, the voltage detection unit 4 is provided with a test stage 15 by which the operation of the voltage comparator 12 and of the switching signal output 14 connected to it can be tested. For this purpose, an overvoltage which is greater than the reference voltage present on the reference input 17 of the voltage comparator 12 can be applied by the test stage 15 to an input 16 of the voltage comparator 12. In this way, when the voltage comparator 12 is working without error, a switching signal which indicates an overvoltage is produced at the switching signal output 14, by whose evaluation it can be established whether the voltage comparator 12 and the switching signal output 14 are operating properly.

As was already stated initially, the voltage protection unit 1, in addition to the shutoff unit 2 and the voltage detection unit 4, has an overvoltage protection unit 18 whose output 19 is connected to the input 9 of the shutoff unit 2. The input of the overvoltage protection unit 18, which is used as coarse protection at the same time, forms the input 5 of the voltage protection unit 1. In the embodiment shown in FIG. 1, the overvoltage protection unit 18 has a fuse 20 and a suppressor diode 21 as the overvoltage protection element. If the overvoltage protection element is a unidirectional suppressor diode or a Z diode, the overvoltage protection unit 18 is also used, at the same time, as protection against reverse polarity for the voltage protection unit 1, and thus, also for the electronic device to be protected.

The reference voltage which is present on the reference input 11 of the voltage comparator 7 is preferably tapped from the reference voltage diode 22. Accordingly, a reference voltage diode 23 is used to produce the reference voltage on the reference input 17 of the voltage comparator 12. However, basically, only a single reference voltage diode can be used for both the voltage comparator 7 of the shutoff unit 2 and also for the voltage comparator 12 of the voltage detection unit 4.

One major advantage of the voltage protection unit 1 in accordance with the invention is that the electronic device to be protected is turned off by the electronic switch 10 when an impermissible voltage is present, as long as the voltage is smaller than the response voltage of the overvoltage protection unit 18. Actuating the electronic switch 10 by way of the voltage comparator 7 specifically ensures that, after eliminating the impermissible voltage, the electric switch 10 is closed again so that the electronic device, without requiring a service intervention for this purpose, is again at the supply voltage. Moreover, the execution of the voltage detection unit 4 enables both reporting of an impermissible voltage by way of the switching signal output 14 and also a function test of the voltage protection arrangement 1 during operation, since the function test can take place without influencing the electronic switch 10.

If the voltage protection arrangement 1 in accordance with the invention is used to protect the control in automation engineering, the individual units or components can have the following values when the supply voltage of the control is, for example, 3.4 V (±5%). To protect this control the overvoltage protection unit 18 has a 6.7 V suppressor diode 21. The voltage $U_1$ at which the voltage comparator 7 opens the switch 10 is 3.835 V, the voltage comparator 7 being switched such that it closes the switch 10 again only at a voltage $U_2$ less than 3.75 V. Implementing this hysteresis prevents circuit oscillation, and thus, continuous opening and closing of the switch 10.

Of course, the voltage protection arrangement 1 in accordance with the invention can also be used for protection of other electronic devices which have a different supply voltage. For example, in an electronic device of automation engineering the supply voltage can be 24 V. In this application, the overvoltage protection unit 18 acting as coarse protection can be made, for example, such that it responds only at a voltage distinctly greater than 30 V, while the voltage $U_1$ of the shutoff unit 2 is roughly 30 V.

Figure 2:
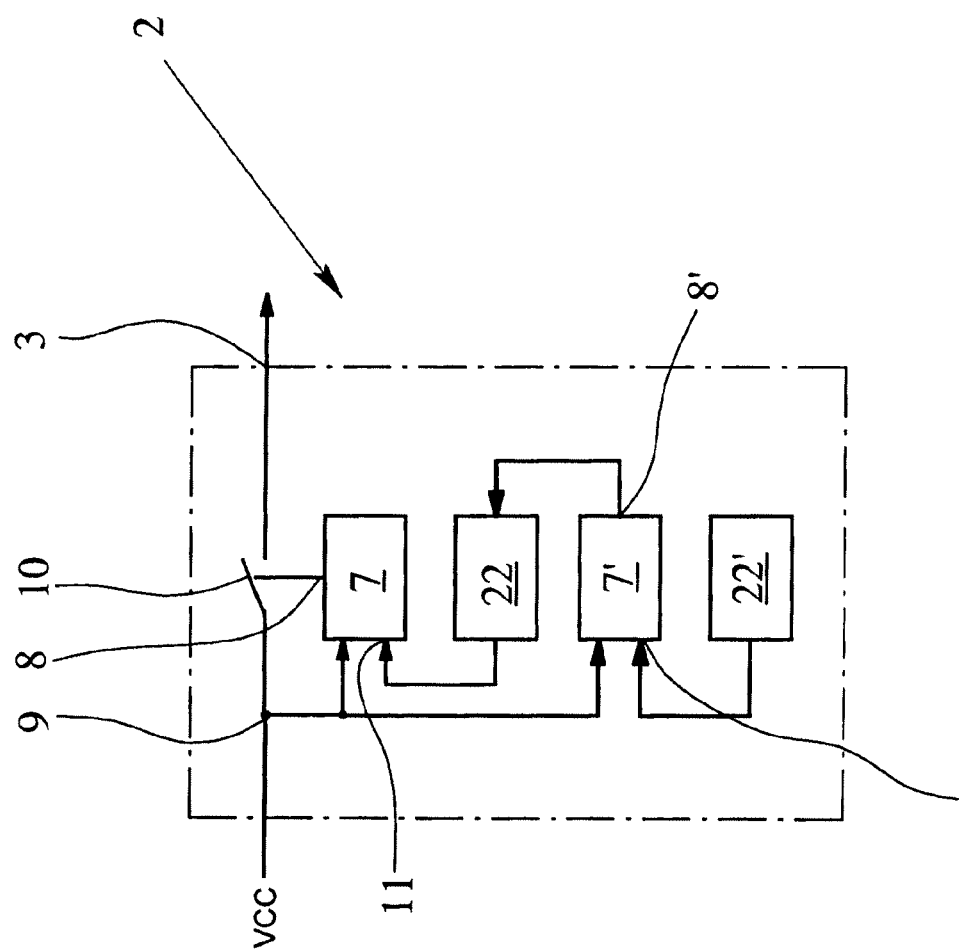
FIG. 2 is a block diagram of a second embodiment of a shutoff unit of a voltage protection arrangement in accordance with the invention.

FIG. 2 shows an alternative configuration of the shutoff unit 2 of a voltage protection arrangement 1. The output 3 of the shutoff unit 2 is connected to the voltage detection unit 4, as in the embodiment as shown in FIG. 1. Also, the input 9 of the shutoff unit 2 can also be connected to the output 19 of the overvoltage protection unit 18. In contrast to the embodiment as shown in FIG. 1, the shutoff unit 2 shown in FIG. 2 has two voltage comparators 7, 7', the first voltage comparator 7' monitoring the supply voltage VCC for undervoltage and the second voltage comparator 7 monitoring the supply voltage VCC for overvoltage.

By way of the reference voltage diode 22' or an alternatively used voltage divider, the comparison value for the undervoltage is set, and by way of the reference voltage diode 22 or an alternatively used second voltage divider, the comparison value for the overvoltage is set. The reference voltage diode 22 or an alternatively used second voltage divider is only active when the supply voltage VCC is greater than the set comparison value of the undervoltage. For this purpose, the output 8' of the first voltage comparator 7' is connected by way of the reference voltage diode 22 to the reference input 11 of the second voltage comparator 7 and the output 8 of the second voltage comparator 7 is connected to the electric switch 10.

Figure 3:
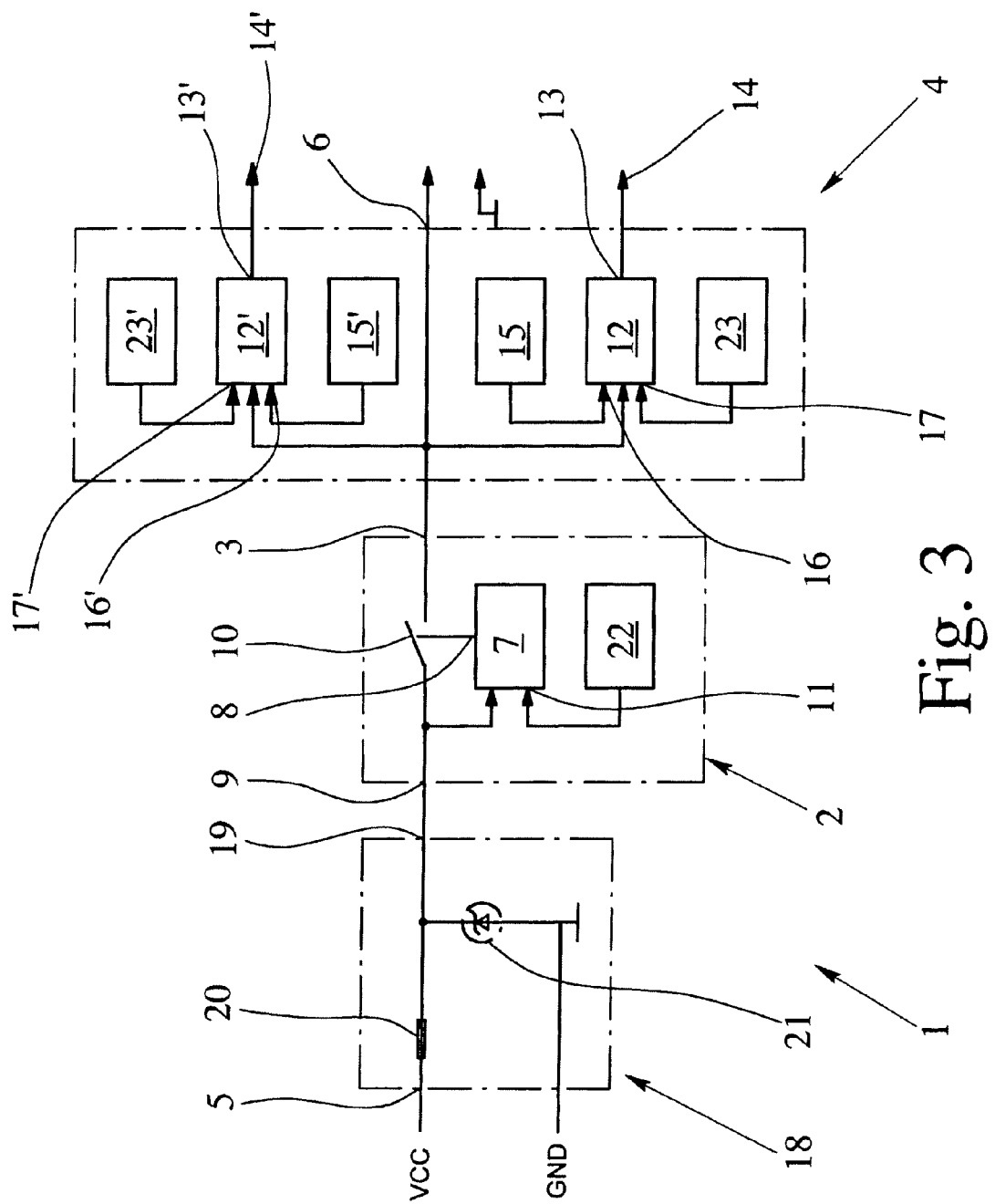
FIG. 3 is a block diagram of another embodiment of a voltage protection arrangement in accordance with the invention.

FIG. 3 shows another configuration of a voltage protection arrangement 1 which differs from the voltage protection arrangement 1 as shown in FIG. 1 only by an alternative configuration of the voltage detection unit 4. In this connection, the voltage detection unit 4 has two voltage comparators 12, 12' with which two different voltages can be monitored for overvoltages. Here, the output 13' of the voltage comparator 12' in the same manner as the output 13 of the voltage comparator 12 has a switching and signal output 14' for reporting an impermissible voltage, and the two switching and signal outputs 14, 14' can also be connected to one another.

To test the voltage comparator 12', it is also connected to a test stage 15', by means of which an overvoltage is applied to the input 16' of the voltage comparator 12' which is greater than the reference voltage present on the reference input 17' of the voltage comparator 12'. To produce the reference voltage on the reference input 17' of the voltage comparator 12', there is a reference voltage diode 23'.

Of course, in the voltage protection unit 1 shown in FIG. 3, instead of the illustrated shutoff unit 2 with only one voltage comparator 7, a shutoff unit 2 as shown in FIG. 2 with two voltage comparators 7, 7' can also be used. Moreover, in a two-channel control of the electronic device to be protected, for example, the CPU of the second channel can trigger both the test voltage on the voltage comparators 12, 12' and also can evaluate the resulting output signal at the switching signal output 14, 14' so that, in this case, a separately made test stage can be omitted.

What is claimed is:

1. Voltage protection arrangement for an electronic device, comprising:

a shutoff unit having an input and an output, the shutoff unit having a first voltage comparator and an electric switch which is closed in a normal case, the electric switch being located between the input and the output of the shutoff unit, and being connected to the output of the voltage comparator, the shutoff unit being constructed so as to shut off the electronic device to be protected when an unallowable voltage arises, a voltage detection unit connected to the output of the shutoff unit, the voltage detection unit having a second voltage comparator and a signal output connected to the output of the second voltage comparator for reporting an impermissible voltage, wherein the electric switch is adapted to open when an impermissible voltage is present at the input of the shutoff unit and being adapted to reclose the switch when an allowable voltage is present again, wherein the voltage detection unit has a test stage with which functioning of the second voltage comparator and of the signal output is able to be tested without influencing the electronic switch.

2. Voltage protection arrangement as claimed in claim 1, further comprising an overvoltage protection unit having an output that is connected to the input of the shutoff unit.

3. Voltage protection arrangement as claimed in claim 2, wherein the overvoltage protection unit has a fuse and an overvoltage protection element.

4. Voltage protection arrangement as claimed in claim 3, wherein the overvoltage protection element is a suppressor diode.

5. Voltage protection arrangement as claimed in claim 1, wherein the voltage comparator of the shutoff unit has hysteresis, the voltage at which the electric switch opens being greater than the voltage at which the switch re-closes.

6. Voltage protection arrangement as claimed in claim 1, wherein the shutoff unit has two voltage comparators, one of the two voltage comparators being a first threshold voltage comparator for ascertaining a first threshold voltage, and the other of the two voltage comparators being a second threshold voltage comparator for ascertaining a second threshold voltage.

7. Voltage protection arrangement as claimed in claim 6, wherein the output of the first threshold voltage comparator is connected to the input of the second threshold voltage comparator and the output of the second threshold voltage comparator is connected to the electric switch.

8. Voltage protection arrangement as claimed in claim 6, wherein the first threshold voltage is an undervoltage limit and wherein the second threshold voltage is an overvoltage limit.

9. Voltage protection arrangement as claimed in claim 1, wherein the voltage detection unit has two voltage comparators each of which is adapted to monitor a respective one of two different voltages.

10. Voltage protection arrangement as claimed in claim 1, wherein the electric switch of the voltage detection unit is a transistor.

11. Voltage protection arrangement as claimed in claim 10, wherein the transistor is a field effect transistor.

12. Voltage protection arrangement as claimed in claim 1, wherein the electric switch of the voltage detection unit is a relay.

13. Voltage protection arrangement as claimed in claim 6, wherein a reference voltage of the voltage comparators of the shutoff unit and the reference voltage of the voltage comparator of the voltage detection unit are derived from a respective reference voltage diode.

14. Voltage protection arrangement as claimed in claim 1, wherein the voltage protection arrangement has at least two channels, the two channels having at least one shutoff unit and a voltage detection unit which is connected to the output of the at least one shutoff unit.

15. Voltage protection arrangement for an electronic device, comprising:

a shutoff unit having an input and an output, the shutoff unit having a first voltage comparator and an electric switch which is closed in a normal case, the electric switch being located between the input and the output of the shutoff unit, and being connected to the output of the voltage comparator, a voltage detection unit connected to the output of the shutoff unit, the voltage detection unit having a second voltage comparator and a signal output connected to the output of the second voltage comparator for reporting an impermissible voltage, wherein the electric switch is adapted to open when an impermissible voltage is present at the input of the shutoff unit and being adapted to reclose the switch when an allowable voltage is present again, wherein the voltage protection arrangement has at least two channels, the two channels having at least one shutoff unit and a voltage detection unit which is connected to the output of the at least one shutoff unit, and wherein one of the channels has a CPU which is adapted for both triggering a test voltage on the voltage comparator of the other channel and evaluating a resulting output signal on the switching signal output of the other channel.

* * * * *